United States Patent
Wang et al.

(10) Patent No.: US 9,470,528 B1
(45) Date of Patent: Oct. 18, 2016

(54) AIRCRAFT SYNTHETIC VISION SYSTEMS UTILIZING DATA FROM LOCAL AREA AUGMENTATION SYSTEMS, AND METHODS FOR OPERATING SUCH AIRCRAFT SYNTHETIC VISION SYSTEMS

(71) Applicant: HONEYWELL INTERNATIONAL INC., Morristown, NJ (US)

(72) Inventors: Guoqing Wang, Beijing (CN); Bin Zhang, Beijing (CN); Lin Du, Beijing (CN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/669,143

(22) Filed: Mar. 26, 2015

(51) Int. Cl.
- *G01C 21/00* (2006.01)
- *G01C 23/00* (2006.01)
- *G08G 5/00* (2006.01)
- *G01C 21/20* (2006.01)
- *G01S 19/42* (2010.01)

(52) U.S. Cl.
CPC .............. *G01C 21/005* (2013.01); *G01C 21/20* (2013.01); *G01C 23/00* (2013.01); *G01S 19/42* (2013.01); *G08G 5/0021* (2013.01); *G08G 5/0078* (2013.01); *G08G 5/0086* (2013.01)

(58) Field of Classification Search
CPC .... G01C 21/005; G01C 21/20; G01C 23/00; G08G 5/0021; G08G 5/0078; G08G 5/0086; G01S 19/42
See application file for complete search history.

(56) References Cited

U.S. PATENT DOCUMENTS

| | | | |
|---|---|---|---|
| 6,975,923 B2 | 12/2005 | Spriggs | |
| 7,218,278 B1 * | 5/2007 | Arethens | B64D 45/04 342/357.24 |

(Continued)

FOREIGN PATENT DOCUMENTS

| | | |
|---|---|---|
| CA | 2811746 A1 | 10/2013 |
| WO | WO2004/034373 A2 * | 4/2004 |

OTHER PUBLICATIONS

Del Core, G. et al.; Virtual Ground Based Augmentation System; Department of Applied Sciences: Navigation Section, Università degli Studi di Napoli "Parthenope"; 2013.

(Continued)

Primary Examiner — Michael J Zanelli
(74) Attorney, Agent, or Firm — Lorenz & Kopf, LLP (57) ABSTRACT

An aircraft synthetic vision display system (SVS) includes a topographical database including topographical information relating to an airport, a global positioning system receiver that receives a satellite signal from a global positioning satellite to determine a geographical position of the aircraft, and a ground-based augmentation system receiver that receives a ground-based signal from a ground-based transmitter associated with the airport, wherein the ground-based signal includes geographical information associated with the airport. The SVS further includes a computer processor that retrieves the topographical information from the topographical database based on the geographical position of the aircraft, that retrieves the geographical information associated with the airport, and that corrects the topographical information using the geographical information associated with the airport to generate corrected topographical information. Still further, the SVS includes a display device that renders three-dimensional synthetic imagery of environs of the aircraft based on the corrected topographical information.

15 Claims, 3 Drawing Sheets

(56) References Cited

U.S. PATENT DOCUMENTS

| | | | | |
|---|---|---|---|---|
| 7,715,978 | B1* | 5/2010 | Wenger | G01C 23/00 340/977 |
| 7,719,483 | B2* | 5/2010 | Feyereisen | G01C 23/00 340/945 |
| 7,737,965 | B2 | 6/2010 | Alter et al. | |
| 7,852,236 | B2 | 12/2010 | Feyereisen et al. | |
| 8,788,128 | B1 | 7/2014 | McCusker | |
| 9,159,241 | B1* | 10/2015 | Murphy | G08G 5/02 |
| 2004/0225432 | A1* | 11/2004 | Pilley | G01C 23/00 701/117 |
| 2007/0005199 | A1 | 1/2007 | He | |
| 2008/0180351 | A1* | 7/2008 | He | G01C 23/00 345/1.1 |
| 2011/0095913 | A1* | 4/2011 | Painter | G01C 23/00 340/972 |
| 2012/0256767 | A1* | 10/2012 | Ca | G01C 23/005 340/947 |
| 2013/0090841 | A1* | 4/2013 | Barraci | G08G 5/0013 701/120 |
| 2013/0282209 | A1 | 10/2013 | Murphy | |
| 2015/0081143 | A1 | 3/2015 | Snow et al. | |

OTHER PUBLICATIONS

McDevitt III, W.J.; The Last 200 Feet—A Low-Cost Approach to Landing Aircraft in Zero-Zero Conditions; 32nd Digital Avionics Systems Conference,Oct. 6-10, 2013.

Croft J.; Taking Synthetic Vision to the Next Level; Avionics makers seek to break the 'sight barrier'; Aviation Week & Space Technology, Jun. 3, 2013.

SESNA Newsroom; Sesar Makes Progress on Precision Landing in Low Visibility; http://www.sesarju.eu/newsroom/allnews/ sesarmakesprogressprecisionlandinglowvisibility; Aug. 20, 2014.

Murphy, T. et al.; Implementation and Operational Use of Ground-Based Augmentation Systems (GBASs)VA Component of the Future Air Traffic Management System; These systems detect and correct aircraft landing position errors by comparing satellite data with data from compact, inexpensive airport based equipment; Proceedings of the IEEE | vol. 96, No. 12, Dec. 2008.

Extended EP Search Report for Application No. 16161746.9-1557 dated Aug. 23, 2016.

* cited by examiner

AIRCRAFT SYNTHETIC VISION SYSTEMS UTILIZING DATA FROM LOCAL AREA AUGMENTATION SYSTEMS, AND METHODS FOR OPERATING SUCH AIRCRAFT SYNTHETIC VISION SYSTEMS

TECHNICAL FIELD

The present disclosure generally relates to aircraft display systems and methods for operating aircraft display systems. More particularly, the present disclosure relates to aircraft synthetic vision systems that utilize data from local area augmentation systems, and methods for operating such aircraft synthetic vision systems.

BACKGROUND

Many aircraft are equipped with one or more vision enhancing systems. Such vision enhancing systems are designed and configured to assist a pilot when flying in conditions that diminish the view from the cockpit. One example of a vision enhancing system is known as a synthetic vision system (hereinafter, "SVS"). A typical SVS is configured to work in conjunction with a position determining unit associated with the aircraft as well as dynamic sensors that sense aircraft altitude, heading, and orientation. The SVS includes or accesses a database containing information relating to the topography along the aircraft's flight path, such as information relating to the terrain and known man-made and natural obstacles proximate the aircraft flight path. The SVS receives inputs from the position determining unit indicative of the aircraft location and also receives inputs from the dynamic sensors. The SVS is configured to utilize the position, heading, altitude, and orientation information and the topographical information contained in the database, and generate a three-dimensional image that shows the topographical environment through which the aircraft is flying from the perspective of a person sitting in the cockpit of the aircraft. The three-dimensional image (also referred to herein as an "SVS image") may be displayed to the pilot on any suitable display unit accessible to the pilot. The SVS image includes features that are graphically rendered including, without limitation, a synthetic perspective view of terrain and obstacles located proximate the aircraft's flight path. Using a SVS, the pilot can look at a display screen of the display unit to gain an understanding of the three-dimensional topographical environment through which the aircraft is flying and can also see what lies ahead. The pilot can also look at the display screen to determine aircraft proximity to one or more obstacles proximate the flight path.

The approach to landing and touch down on the runway of an aircraft is probably the most challenging task a pilot undertakes during normal operation. To perform the landing properly, the aircraft approaches the runway within an envelope of attitude, course, speed, and rate of descent limits. The course limits include, for example, both lateral limits and glide slope limits. In some instances visibility may be poor during approach and landing operations, resulting in what is known as instrument flight conditions. During instrument flight conditions, pilots rely on instruments, rather than visual references, to navigate the aircraft. Even during good weather conditions, pilots typically rely on instruments to some extent during the approach. Some SVS systems known in the art have been developed to supplement the pilot's reliance on instruments. For example, these systems allow pilots to descend to a low altitude, e.g., to 150 feet above the runway, using a combination of databases, advanced symbology, altimetry error detection, and high precision augmented coordinates. These systems utilize a wide area augmentation system (WAAS) GPS navigation aid, a flight management system, and an inertial navigation system to dynamically calibrate and determine a precise approach course to a runway and display the approach course relative to the runway centerline direction to pilots using the SVS.

The usefulness of these SVS systems for approach and landing is limited, however, by the accuracy of the topographical database, particularly in the terminal area of the airport. It has been discovered, for example, that in some instances, published terminal area topographical data may include unintended errors or biases in relation to the geographic position of certain features, such as runways, obstacles, etc. If these errors or biases are then introduced into the SVS topographical databases, then the 3-D rendered images presented to the pilot on the SVS may not match the aircraft's actual environment, which is problematic in the context of flying a precision approach to the airport supplemented by the SVS.

Accordingly, it is desirable to provide SVS systems and methods that are able to validate topographical information contained in a topographical database, in particular the geographical location of runways and obstacles in the terminal area of an airport. It is also desirable to provide such SVS systems and methods that are capable of correcting any errors or biases in the topographical database that may be determined by the validation. Furthermore, other desirable features and characteristics of exemplary embodiments will become apparent from the subsequent detailed description and the appended claims, taken in conjunction with the accompanying drawings and the foregoing technical field and background.

BRIEF SUMMARY

Provided are aircraft synthetic vision systems that utilize data from local area augmentation systems, and methods for operating such aircraft synthetic vision systems. In one exemplary embodiment, an aircraft synthetic vision display system (SVS) includes a topographical database including topographical information relating to an airport, a global positioning system receiver that receives a satellite signal from a global positioning satellite to determine a geographical position of the aircraft, and a ground-based augmentation system receiver that receives a ground-based signal from a ground-based transmitter associated with the airport, wherein the ground-based signal includes geographical information associated with the airport. The SVS further includes a computer processor that retrieves the topographical information from the topographical database based on the geographical position of the aircraft, that retrieves the geographical information associated with the airport, that validates the topographical information using the geographical information associated with the airport, and that corrects the topographical information using the geographical information associated with the airport to generate corrected topographical information. Still further, the SVS includes a display device that renders three-dimensional synthetic imagery of environs of the aircraft based on the corrected topographical information.

In another exemplary embodiment, a method of operating a synthetic vision system of an aircraft includes the steps of receiving a satellite signal from a global positioning satellite to determine a geographical position of the aircraft and receiving a ground-based signal from a ground-based transmitter associated with the airport, wherein the ground-based signal includes geographical information associated with the airport. The method further includes, using a computer processor, retrieving topographical information based on the geographical position of the aircraft, retrieving the geographical information associated with the airport, validating the topographical information using the geographical information associated with the airport, and correcting the topographical information using the geographical information associated with the airport to generate corrected topographical information. The method further includes rendering three-dimensional synthetic imagery of environs of the aircraft based on the corrected topographical information.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
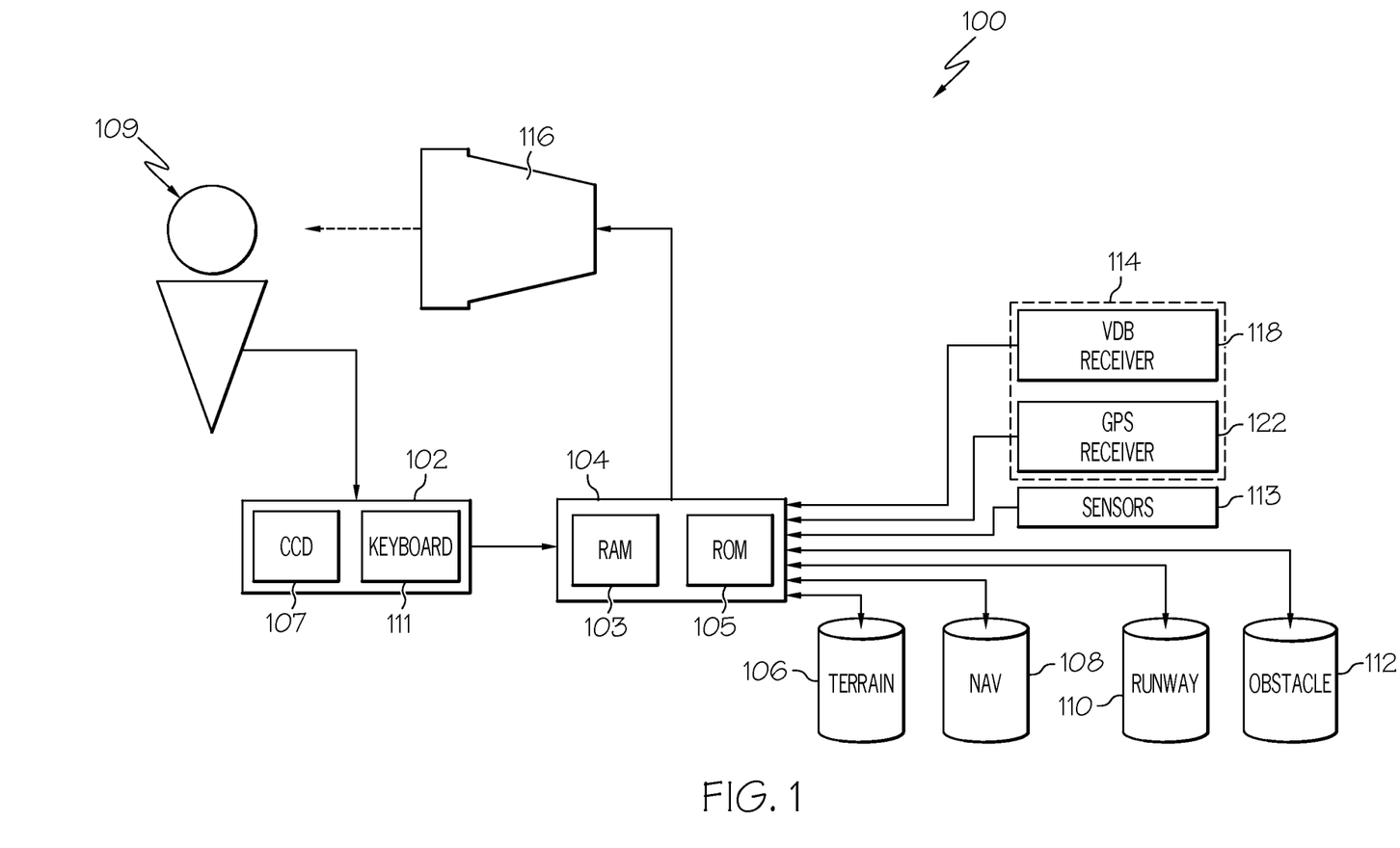
FIG. 1 is a functional block diagram of a synthetic vision system according to an exemplary embodiment of the present disclosure.

Embodiments of the present disclosure utilize ground-based data sources located at an airport, such as a local area augmentation system (LAAS), to validate the data from the topographical databases (particularly navigational database 108, runway database 110, and obstacle database 112). If the topographical database information does not match the information from the ground-based data source, then there is determined to be an error or bias in the data from the topographical databases. The error or bias is then corrected utilizing the information from the ground-based data source. The corrected topographical information is then utilized by the processor 104 to provide an accurate display on the display device 116 of the SVS 100. The accurate display includes an accurate runway position, accurate obstacle positions, and accurate terrain renderings. With this verified and corrected display, the SVS 100 can be used as a supplement to the aircraft's instrument approach systems (e.g., ILS, VOR, GPS) until about 150 feet height above threshold (HAT).

As used herein, the term "synthetic vision system" refers to a system that provides computer-generated images of the external scene topography from the perspective of the flight deck, derived from aircraft attitude, high-precision navigation solution, and database of terrain, obstacles, and relevant cultural features. A synthetic vision system is an electronic means to display a synthetic vision depiction of the external scene topography to the flight crew. Synthetic vision creates an image relative to terrain and airport within the limits of the navigation source capabilities (position, altitude, heading, track, and the database limitations). The application of synthetic vision systems is through a primary flight display from the perspective of the flight deck or through a secondary flight display.

Referring to FIG. 1, an exemplary synthetic vision system is depicted and will be described in accordance with various embodiments of the present disclosure. The system 100 includes a user interface 102, a processor 104, one or more terrain databases 106, one or more navigation databases 108, one or more runway databases 110, one or more obstacle databases 112, various sensors 113, a multi-mode receiver (MMR) 114, and a display device 116. The user interface 102 is in operable communication with the processor 104 and is configured to receive input from a user 109 (e.g., a pilot) and, in response to the user input, supply command signals to the processor 104. The user interface 102 may be any one, or combination, of various known user interface devices including, but not limited to, a cursor control device (CCD) 107, such as a mouse, a trackball, or joystick, and/or a keyboard, one or more buttons, switches, or knobs. In the depicted embodiment, the user interface 102 includes a CCD 107 and a keyboard 111. The user 109 uses the CCD 107 to, among other things, move a cursor symbol on the display screen (see FIG. 2), and may use the keyboard 111 to, among other things, input textual data.

The processor 104 may be any one of numerous known general-purpose microprocessors or an application specific processor that operates in response to program instructions. In the depicted embodiment, the processor 104 includes on-board RAM (random access memory) 103, and on-board ROM (read only memory) 105. The program instructions that control the processor 104 may be stored in either or both of the RAM 103 and the ROM 105. For example, the operating system software may be stored in the ROM 105, whereas various operating mode software routines and various operational parameters may be stored in the RAM 103. It will be appreciated that this is merely exemplary of one scheme for storing operating system software and software routines, and that various other storage schemes may be implemented. It will also be appreciated that the processor 104 may be implemented using various other circuits, not just a programmable processor. For example, digital logic circuits and analog signal processing circuits could also be used.

No matter how the processor 104 is specifically implemented, it is in operable communication with the terrain databases 106, the navigation databases 108, the runway databases 110, the obstacle databases 112, and the display device 116, and is coupled to receive various types of external data from the various sensors 113 (such as airspeed, altitude, air temperature, heading, etc.), and various aircraft position-related data from the MMR 114, which receives signals from various external position-related data sources such as VOR, GPS, WAAS, LAAS, ILS, MLS, NDB, etc.

The processor 104 is configured, in response to the position-related data, to selectively retrieve terrain data from one or more of the terrain databases 106, navigation data from one or more of the navigation databases 108, runway data from one or more of the runway databases 110, and obstacle data from one or more of the obstacle databases 112, and to supply appropriate display commands to the display device 116. The display device 116, in response to the display commands, selectively renders various types of textual, graphic, and/or iconic information. A brief description of the databases 106, 108, 110, and 112, the sensors 113, and the MMR 114, at least in the depicted embodiment, will be provided.

The terrain databases 106 include various types of data representative of the terrain over which the aircraft is flying, and the navigation databases 108 include various types of navigation-related data. These navigation-related data include various flight plan related data such as, for example, waypoints, distances between waypoints, headings between waypoints, data related to different airports, navigational aids, obstructions, special use airspace, political boundaries, communication frequencies, and aircraft approach information. It will be appreciated that, although the terrain databases 106, the navigation databases 108, the runway databases 110, and the obstacle databases 112 are, for clarity and convenience, shown as being stored separate from the processor 104, all or portions of either or both of these databases 106, 108, 110, 112 could be loaded into the RAM 103, or integrally formed as part of the processor 104, and/or RAM 103, and/or ROM 105. The databases 106, 108, 110, 112 could also be part of a device or system that is physically separate from the system 100.

In one exemplary embodiment, the processor 104 is adapted to receive terrain data from the terrain database 106 and navigation data from the navigation database 108, operable, in response thereto, to supply one or more image rendering display commands. The display device 116 is coupled to receive the image rendering display commands and is operable, in response thereto, to simultaneously render (i) a perspective view image representative of the terrain data and navigation data and (ii) one or more terrain-tracing lines. The perspective view image includes terrain having a profile determined by elevations of the terrain. Each terrain-tracing line (i) extends at least partially across the terrain, (ii) represents at least one of a ground-referenced range to a fixed location on the terrain and a aircraft-referenced range from the aircraft to a fixed range away from the aircraft, and (iii) conforms to the terrain profile.

Notably, the visibility of the terrain information displayed on the screen of visual display 116 may be enhanced responsive to one or more suitable algorithms (e.g., implemented in software) executed by the processor 104, which functions to determine an aircraft's current position, heading and speed, and initially loads a patch of terrain data for a region that is suitably sized to provide a rapid initialization of the data. The processor 104 monitors the aircraft's position, heading, and speed (also attitude when pertinent) from sensors 113 and MMR 114, and continuously predicts the potential boundaries of a three-dimensional region (volume) of terrain in the flight path based on the aircraft's then-current position, heading and speed (and attitude when pertinent). The processor 104 compares the predicted boundaries with the boundaries of the initially loaded terrain data, and if the distance from the aircraft to a predicted boundary is determined to be less than a predetermined value (e.g., distance value associated with the boundaries of the initially loaded data), then the processor 104 initiates an operation to load a new patch of terrain data that is optimally sized given the aircraft's current position, heading and speed (and attitude when pertinent). Notably, for this example embodiment, the processor 104 can execute the data loading operations separately from the operations that determine the aircraft's current position, heading and speed, in order to maintain a constant refresh rate and not interfere with the continuity of the current display of terrain.

One important aspect of situational awareness is to be aware of obstacles which pose a threat to the craft. This is particularly true for aircraft during take-off and landing or other low altitude operations and even more so in low visibility conditions. Some displays depict information on obstacles in or near the aircraft's travel path. Obstacle data should be presented in such a way that it will provide timely awareness of the height, location, and distance of possible threats without distracting from the other primary information on the display. The processor 104 generates data for display on the display 116 based on the position of the aircraft and obstacle data. Obstacles can be sought and displayed for different locations along one or more flight paths, thereby assisting an operator choose the safest path to follow. The obstacle database 112 may contain data regarding obstacles, wherein the processor 104 sends a signal to the display 116 to render a simulated graphical representation of the obstacle based on that data, or the obstacle database may contain actual images of the obstacles, wherein the processor 104 sends a signal to display the actual image based on the positional data.

The processor 104 analyzes the data received from the obstacle database 112 and determines if the obstacles are within a selected distance from the aircraft. Obstacles that are not within a selected distance are not displayed. This procedure saves processor load and reduces display clutter by only displaying obstacles that are of interest to the aircraft. Size, speed, and altitude of the aircraft and size of the obstacle may be considered along with distance in determining whether to display the obstacle.

The runway database 110 may store data related to, for example, runway lighting, identification numbers, position, and length, width, and hardness. As an aircraft approaches an airport, the processor 104 receives the aircraft's current position from, for example, the MMR 114 and compares the current position data with the distance and/or usage limitation data stored in the database for the landing system being used by that airport.

The sensors 113 may be implemented using various types of sensors, systems, and or subsystems, now known or developed in the future, for supplying various types of aircraft data. The aircraft data may also vary, but preferably include data representative of the state of the aircraft such as, for example, aircraft speed, heading, altitude, and attitude. The number and type of data sources received into MMR 114 may also vary. However, for ease of description and illustration, only a VHF data broadcast (VDB) receiver 118 functionality and a global position system (GPS) receiver 122 functionality are depicted in FIG. 1, as these receivers are particularly relevant to the discussion of the present disclosure. As noted above, though, modern MMRs include the ability to receive many more signals beyond the illustrated GPS and VDB receiver functionalities.

The GPS receiver 122 functionality is a multi-channel receiver, with each channel tuned to receive one or more of the GPS broadcast signals transmitted by the constellation of GPS satellites (not illustrated) orbiting the earth. Each GPS satellite encircles the earth two times each day, and the orbits are arranged so that at least four satellites are always within line of sight from almost anywhere on the earth. The GPS receiver 122, upon receipt of the GPS broadcast signals from at least three, and preferably four, or more of the GPS satellites, determines the distance between the GPS receiver 122 and the GPS satellites and the position of the GPS satellites. Based on these determinations, the GPS receiver 122, using a technique known as trilateration, determines, for example, aircraft position, groundspeed, and ground track angle. These data may be supplied to the processor 104, which may determine aircraft glide slope deviation therefrom. Preferably, however, the GPS receiver 122 is configured to determine, and supply data representative of, aircraft glide slope deviation to the processor 104.

The VDB receiver 118 functionality is a multi-channel receiver configured to received VHF signals in the 108.0 to 117.975 MHz band from a ground station that is associated with a particular airport. The VHF data signals include corrections for GPS satellite signals. The VHF data signals also include broadcast information that is used to define a reference path typically leading to the runway intercept point. This data can include information for as many as 49 different reference paths using a single radio frequency. (Even more reference paths could be supported by using additional radio frequencies.) The VDB signal employs a differential 8-phase shift key (D8PSK) waveform. This waveform was chosen because of the relatively good spectral efficiency in terms of the number of bits per second that can be supported within a 25 kHz frequency assignment. Four message types are currently defined for VDB signals. Message Type 1 includes differential correction and integrity related data for the GPS satellites. Message Type 4 includes final approach segment definitions for each runway end or approach at the airport.

The display device 116, as noted above, in response to display commands supplied from the processor 104, selectively renders various textual, graphic, and/or iconic information, and thereby supply visual feedback to the user 109. It will be appreciated that the display device 116 may be implemented using any one of numerous known display devices suitable for rendering textual, graphic, and/or iconic information in a format viewable by the user 109. Non-limiting examples of such display devices include various cathode ray tube (CRT) displays, and various flat panel displays such as various types of LCD (liquid crystal display) and TFT (thin film transistor) displays. The display device 116 may additionally be implemented as a panel mounted display, a HUD (head-up display) projection, or any one of numerous known technologies. It is additionally noted that the display device 116 may be configured as any one of numerous types of aircraft flight deck displays. For example, it may be configured as a multi-function display, a horizontal situation indicator, or a vertical situation indicator, just to name a few. In the depicted embodiment, however, the display device 116 is configured as a primary flight display (PFD).

Figure 2:
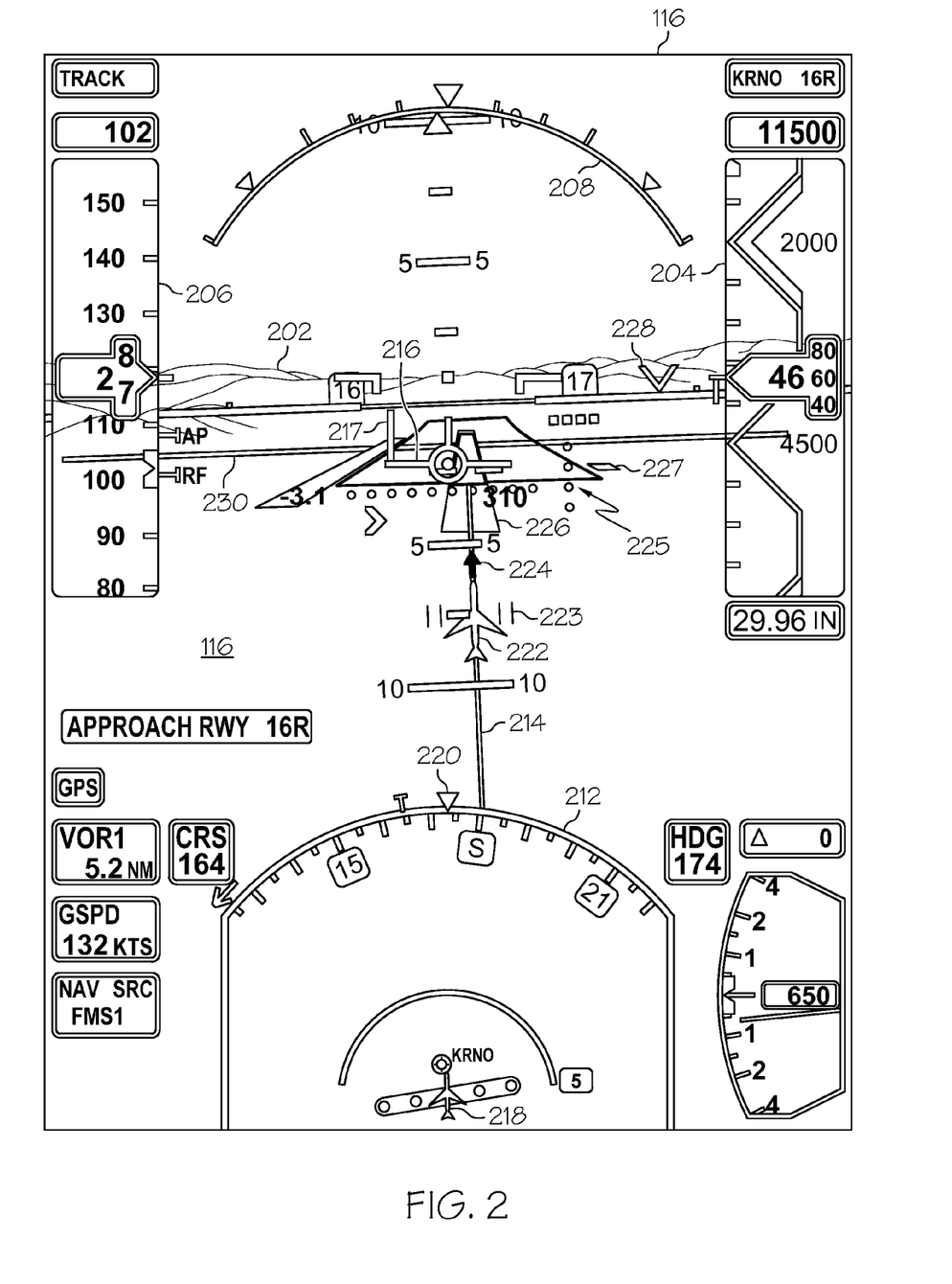
FIG. 2 is an exemplary image that may be rendered on the synthetic vision system of FIG. 1.

Referring to FIG. 2, exemplary textual, graphical, and/or iconic information rendered by the display device 116, in response to appropriate display commands from the processor 104 is depicted. It is seen that the display device 116 renders a view of the terrain 202 ahead of the aircraft, preferably as a three-dimensional perspective view, an altitude indicator 204, an airspeed indicator 206, an attitude indicator 208, a compass 212, an extended runway centerline 214, a flight path vector indicator 216, and an acceleration cue 217. The heading indicator 212 includes an aircraft icon 218, and a heading marker 220 identifying the current heading (a heading of 174 degrees as shown). An additional current heading symbol 228 is disposed on the zero pitch reference line 230 to represent the current aircraft heading when the center of the forward looking display 116 is operating in a current track centered mode. The center of the forward looking display 116 represents where the aircraft is moving and the heading symbol 228 on the zero-pitch reference line 230 represent the current heading direction. The compass 212 can be shown either in heading up, or track up mode with airplane symbol 218 representing the present lateral position. Additional information (not shown) is typically provided in either graphic or numerical format representative, for example, of glide slope, altimeter setting, and navigation receiver frequencies.

An aircraft icon 222 is representative of the current heading direction, referenced to the current ground track 224, with the desired track as 214 for the specific runway 226 on which the aircraft is to land. A distance remaining marker 227 may be shown on the display 116, in a position ahead of the aircraft, to indicate the available runway length ahead, and the distance remaining marker 227 may change color if the distance remaining becomes critical. Lateral deviation marks 223 and vertical deviation marks 225 on perspective conformal deviation symbology represent a fixed ground distance from the intended flight path. The desired aircraft direction is determined, for example, by the processor 104 using data from the navigation database 108, the sensors 113, and the external data sources 114. It will be appreciated, however, that the desired aircraft direction may be determined by one or more other systems or subsystems, and from data or signals supplied from any one of numerous other systems or subsystems within, or external to, the aircraft. Regardless of the particular manner in which the desired aircraft direction is determined, the processor 104 supplies appropriate display commands to cause the display device 116 to render the aircraft icon 222 and ground track icon 224.

As noted previously, the usefulness of the SVS system 100 for approach and landing is limited by the accuracy of the topographical databases 106, 108, 110, and 112, particularly in the terminal area of the airport. It has been discovered, for example, that in some instances, published terminal area topographical data may include unintended errors or biases in relation to the geographic position of certain features, such as runways (database 110), obstacles (database 112), etc. If these errors or biases are then introduced into the SVS topographical databases, then the 3-D rendered images presented to the pilot on the SVS may not match the aircraft's actual environment, which is problematic in the context of flying a precision approach to the airport supplemented by the SVS.

Embodiments of the present disclosure utilize ground-based data sources located at an airport, such as a local area augmentation system, to validate the data from the topographical databases (particularly runway database 110). If the topographical database information does not match the information from the ground-based data source, then there is determined to be an error or bias in the data from the topographical databases. The error or bias is then corrected utilizing the information from the ground-based data source. The corrected topographical information is then utilized by the processor 104 to provide an accurate display on the display device 116 of the SVS 100. The accurate display includes an accurate runway position, accurate obstacle positions, and accurate terrain renderings. With this verified and corrected display, the SVS 100 can be used as a supplement to the aircraft's instrument approach systems (e.g., ILS, VOR, GPS) until about 150 feet height above threshold.

A LAAS at an airport generally includes local reference receivers located around the airport that send data to a central location at the airport. This data is used to formulate a correction message (Type 1), which is then transmitted to users via VDB. The VDB receiver 118 functionality on the aircraft uses this information to correct GPS signals, which then provides a standard ILS-style display to use while flying a precision approach. The LAAS VDB transmitters also transmit broadcast information that is used to define a reference path typically leading to the runway intercept point (message Type 4), which includes final approach segment definitions for each runway end or approach at the airport.

An aircraft on approach to the airport will begin receiving LAAS VDB signals once the aircraft enters within the usable range of the LAAS system, which is usually about a 25 nm radius from the airport. Prior to entering the usable range, the SVS 100 is receiving GPS data (receiver functionality 122 of the MMR 114). SVS 100 relies on the GPS data, and the topographical databases 106, 108, 110, and 112 to display the image on display 116. Upon entering the LAAS usable range, the aircraft begins to receive the VDB signal from the LAAS via the VDB receiver 118 functionality of the MMR 114. Message Type 4 of the VDB signal includes final approach segment definitions, for example in terms of geographic reference coordinates. The topographical database information, particularly that of databases 108, 110 and 112, may then be validated using the message Type 4 information from the VDB signal. If the topographical database information does not match the message Type 4 information, then there may be determined to be an error or bias in the topographical database information. The message Type 4 information from the VDB signal is then used to correct the topographical information. The corrected topographical information is then used to render the SVS display on display device 116, providing the flight crew with a high-fidelity SVS display that may be used as a supplement for use during an instrument approach, down to a HAT of about 150 feet.

The use of LAAS message Type 4 information as validation should not be understood to exclude the use of other validation data source. For example, in addition to the foregoing described validation, message Type 1 information may be used to validate and correct the GPS signal, which may then be used by the SVS 100 as part of its display/validation scheme. Moreover, satellite-based correction signals from a wide area augmentation system (WAAS) may be used for the same purpose. Still further, onboard validation means, such as inertial navigation systems (INS), may be used to validate and cross-check the received GPS signal for purposes of providing an accurate SVS display that is usable as a supplement with instrument approaches.

In some embodiments, it is proposed that that the VDB is modified to carry more information, e. g., runway closure NOTAM, runway occupancy status, hold short traffic information, etc., to facilitate a timely and improved visual situational awareness. This runway closure NOTAM, runway occupancy status, or hold short traffic information may be displayed to the flight crew as an appropriate graphical or textual indication on the display 116 of SVS 100. For example, runway closure NOTAMs may be provided in text, runway occupancy status may be indicated by an aircraft symbol on the runway, and hold short traffic information may be indicated as an appropriate line or bar at the hold short point of the runway.

In further embodiments, the SVS 100 may include a "level of service" monitor to indicate the health of the SVS 100. Various monitors may validate the information and allow the synthetic scene to be used for navigation and lower minimums. The level of service monitor may be provided on display device 116, and may include green text that lists the type of approach, the unique identifier for the approach, and a label that indicates the health of the SVS 100. When the label is written in green text, it means that the approach is usable, and that all of the validation scheme are operating properly (and that if any error or bias has been detected, it has been appropriately corrected using the VDB information). An audible signal or its accompanying text in an amber box in the level of service monitor means the approach must either be abandoned or flown as a normal ILS or other instrument approach. Below the normal ILS or other approach minimums, the box turns red and pilots must fly the missed-approach procedure.

Figure 3:
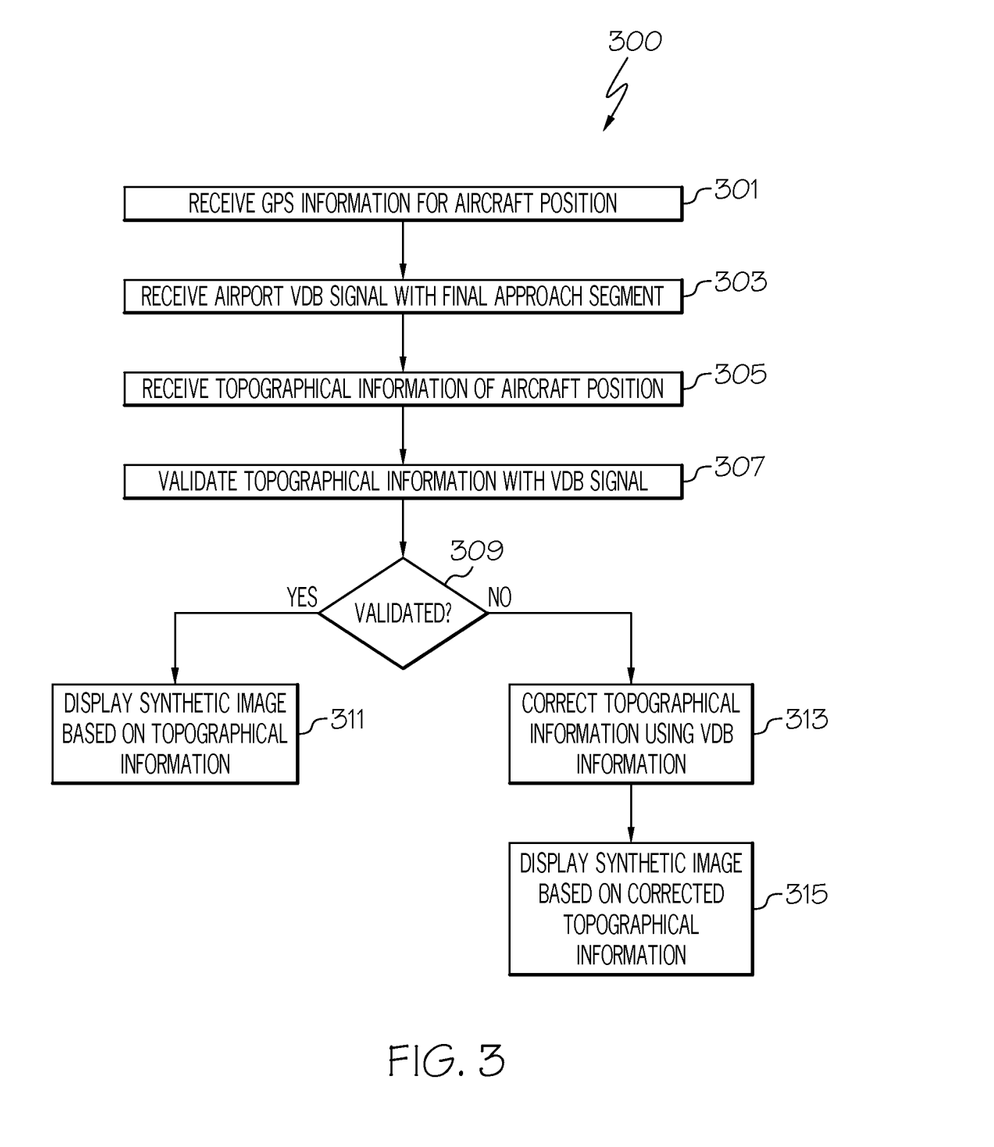
FIG. 3 is a flow chart illustrating a method of operation for the synthetic vision system of FIG. 1 in accordance with exemplary embodiment of the present disclosure.

FIG. 3 provides an exemplary flowchart of a method of operation 300 of the SVS 100 in accordance with an exemplary embodiment of the present disclosure. At step 301, the SVS receives a GPS signal indicating a position of the aircraft. At step 303, the SVS receives a VDB signal including final approach segment information from a ground-based augmentation system (i.e., a LAAS) at an airport. At step 305, the SVS accesses one or more topographical databases (i.e., terrain, navigation, runway, and/or obstacle) and retrieved topographical information pertaining to the position of the aircraft. At step 307, the SVS uses the VDB signal to validate the topographical information. Step 309 is a determining step wherein the SVS determines whether the topographical information has been validated, i.e., whether the topographical information matches the VDB signal information. At step 311, if the topographical information has been validated, the SVS displays a synthetic vision image to the flight crew of the aircraft on a flight display based on the topographical information. At step 313, if the information does not match, then the topographical information is corrected using the VDB information, namely the final approach segment information. Then, at step 315, the SVS displays a synthetic image to the flight crew of the aircraft on the flight display based on the correct topographical information.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft synthetic vision display system comprising:
   a topographical database comprising topographical information relating to an airport;
   a global positioning system receiver that receives a satellite signal from a global positioning satellite to determine a geographical position of the aircraft;
   a ground-based augmentation system receiver that receives a ground-based signal from a ground-based transmitter associated with the airport, wherein the ground-based augmentation system receiver receives the ground-based signal from a local area augmentation system associated with the airport, wherein the ground-based signal comprises a very-high frequency data broadcast (VDB) signal, wherein the VDB signal comprises: geographical information associated with the airport, message Type 4 information comprising final approach segment information associated with an approach to a runway at the airport, and runway occupancy status information;
   a computer processor that retrieves the topographical information from the topographical database based on the geographical position of the aircraft, that retrieves the geographical information associated with the airport, that validates the topographical information using the geographical information associated with the airport, and that corrects the topographical information using the geographical information associated with the airport to generate corrected topographical information; and
   a display device that renders three-dimensional synthetic imagery of environs of the aircraft based on the corrected topographical information, the three-dimensional synthetic imagery further comprising a graphical rendering of the runway at the airport, the final approach segment based on the message Type 4 information, and an aircraft symbol on the runway based on the runway occupancy status information.

2. The system of claim 1, wherein the topographical database comprises a terrain database that comprises terrain information associated with the airport.

3. The system of claim 1, wherein the topographical database comprises a navigation database that comprises navigational information for navigational routing and procedures associated with the airport.

4. The system of claim 1, wherein the topographical database comprises a runway database that comprises runway information associated with the airport.

5. The system of claim 1, wherein the topographical database comprises an obstacle database that comprises obstacle information concerning obstacles in the vicinity of the airport.

6. The system of claim 1, wherein a multi-mode receiver comprises the global positioning system receiver and the ground-based augmentation system receiver.

7. The system of claim 1, wherein the topographical information comprises an error or a bias that causes a feature of the airport to be indicated at a geographical location other than its true geographical location.

8. A method of operating a synthetic vision system of an aircraft comprising the steps of:
   receiving a satellite signal from a global positioning satellite to determine a geographical position of the aircraft;
   receiving a ground-based signal from a ground-based transmitter associated with the airport, wherein the ground-based signal comprises a very-high frequency data broadcast (VDB) signal, wherein the VDB signal comprises: geographical information associated with the airport, message Type 4 information comprising final approach segment information associated with an approach to a runway at the airport, and runway occupancy status information;
   using a computer processor:
      retrieving topographical information from a topographical database based on the geographical position of the aircraft,
      retrieving the geographical information associated with the airport,
      validating the topographical information using the geographical information associated with the airport, and
      correcting the topographical information using the geographical information associated with the airport to generate corrected topographical information; and
   rendering three-dimensional synthetic imagery of environs of the aircraft based on the corrected topographical information, the three-dimensional synthetic imagery further comprising a geographical rendering of the runway at the airport, the final approach segment based on the message Type 4 information, and an aircraft symbol on the runway based on the runway occupancy status information.

9. The method of claim 8, wherein receiving topographical information comprises receiving terrain information associated with the airport.

10. The method of claim 8, wherein receiving topographical information comprises receiving navigational information for navigational routing and procedures associated with the airport.

11. The method of claim 8, wherein receiving topographical information comprises receiving obstacle information concerning obstacles in the vicinity of the airport.

12. The method of claim 8, wherein receiving the topographical information comprises receiving topographical information that comprises an error or a bias that causes a feature of the airport to be indicated at a geographical location other than its true geographical location.

13. An aircraft synthetic vision display system comprising:
   a plurality of topographical databases comprising topographical information relating to an airport, wherein the plurality of topographical databases comprise at least a terrain database that comprises terrain information associated with the airport, a navigation database that comprises navigational information for navigational routing and procedures associated with the airport, a runway database that comprises runway information associated with the airport, and an obstacle database that comprises obstacle information concerning obstacles in the vicinity of the airport, and wherein the topographical information comprises an error or bias that causes a feature of the airport to be indicated at a geographical location other than its true geographical location;

a multi-mode receiver comprising a plurality of receiver functionalities comprising at least a global positioning system receiver that receives a satellite signal from a global positioning satellite to determine a geographical position of the aircraft and a very-high frequency data broadcast (VDB) receiver that receives a ground-based VDB signal from a local area augmentation system transmitter associated with the airport, wherein the ground-based signal comprises a Type 4 message including geographical information associated with the airport that comprises final approach segment geographical information pertaining to a runway of the airport and runway occupancy status information;

a computer processor that retrieves the topographical information from the topographical database based on the geographical position of the aircraft, that retrieves the geographical information associated with the airport, that validates the topographical information using the geographical information associated with the airport, and that corrects the topographical information using the geographical information associated with the airport to generate corrected topographical information; and a display device that renders three-dimensional synthetic imagery of environs of the aircraft based on the corrected topographical information, wherein the three-dimensional synthetic imagery comprises a graphical rendering of at least the runway of the airport, the final approach segment based on the message Type 4 information, and an aircraft symbol on the runway based on the runway occupancy status information.

14. The synthetic vision display system of claim 13, wherein the VDB signal further comprises runway hold short information, and wherein the three-dimensional synthetic imagery comprises a graphical rendering of the runway hold short information on the runway as a graphical bar on the runway.

15. The synthetic vision display system of claim 14, wherein the VDB signal further comprises runway closure Notice to Airmen (NOTAM) information, and wherein the three-dimensional synthetic imagery comprises textual indication of the runway closure NOTAM.

* * * * *